May 7, 1968     K. R. RUNDE     3,381,538
VIBRATION APPARATUS
Filed May 14, 1965     3 Sheets-Sheet 1
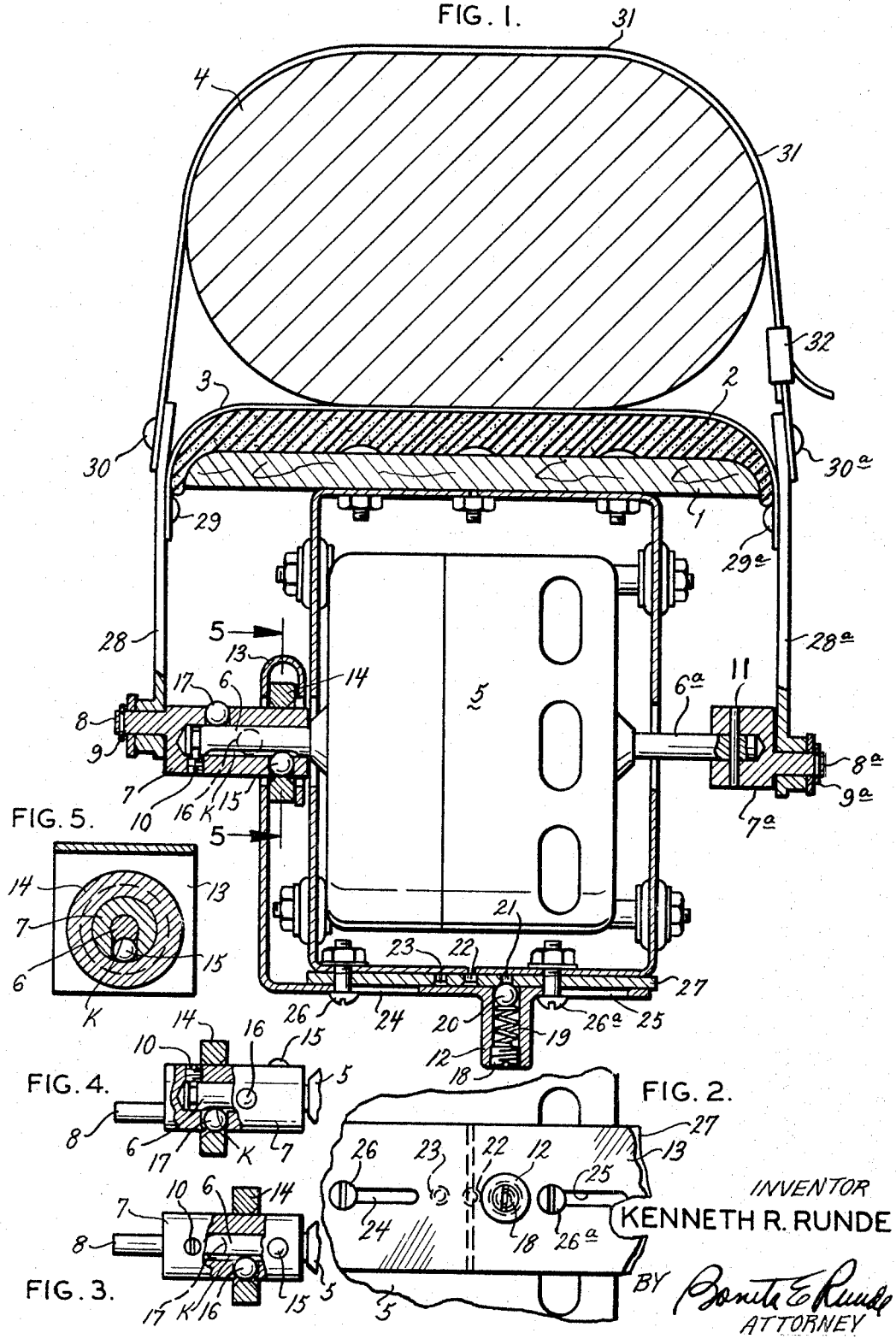
INVENTOR
KENNETH R. RUNDE
BY *Bonita E. Runde*
ATTORNEY

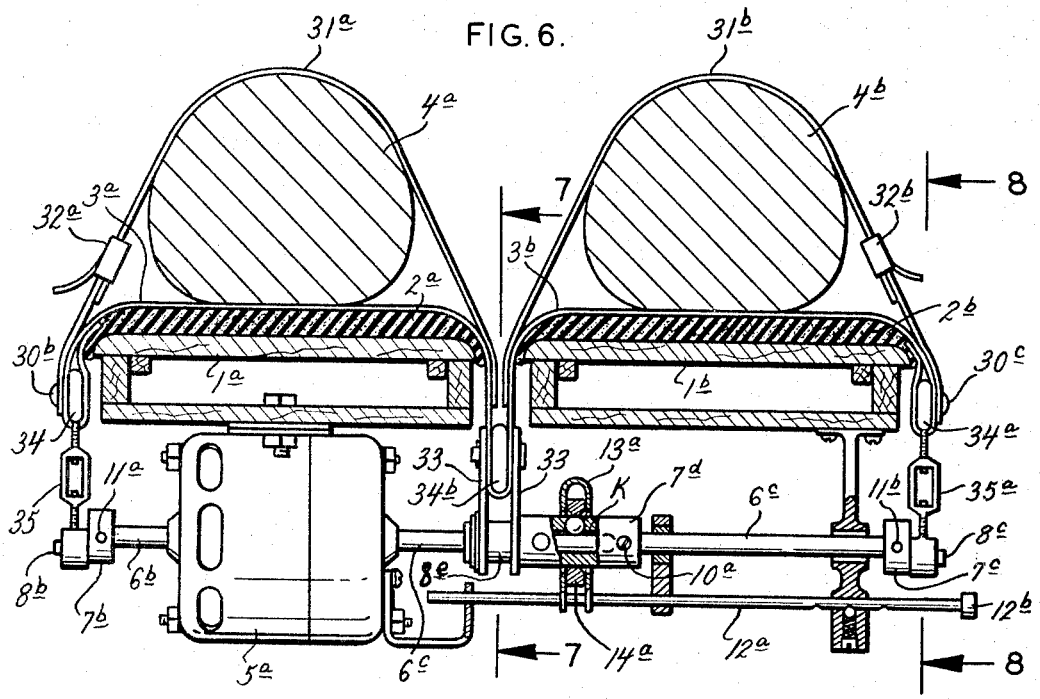
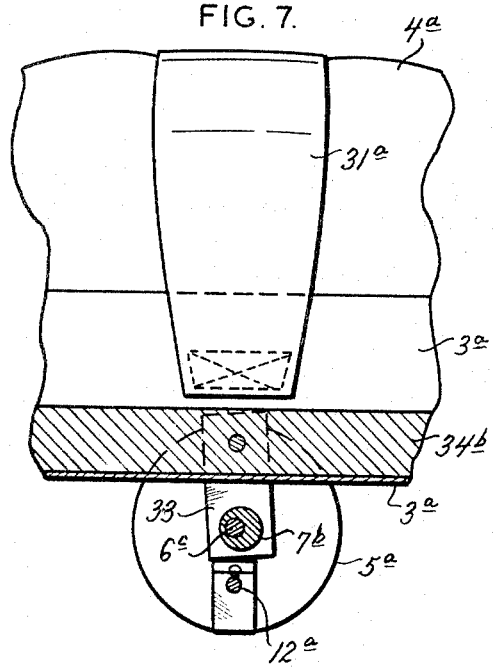
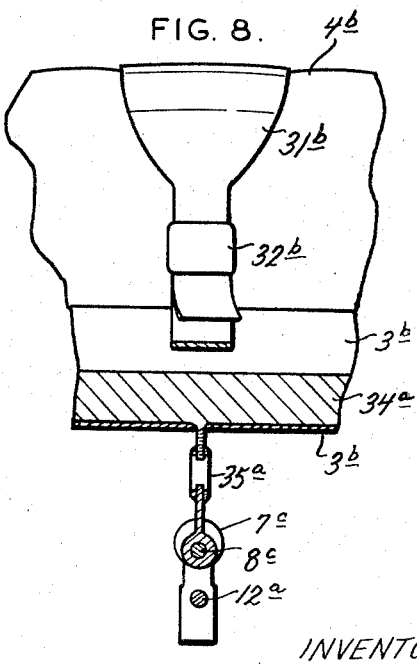

May 7, 1968  K. R. RUNDE  3,381,538
VIBRATION APPARATUS
Filed May 14, 1965 3 Sheets-Sheet 3
FIG. 9.
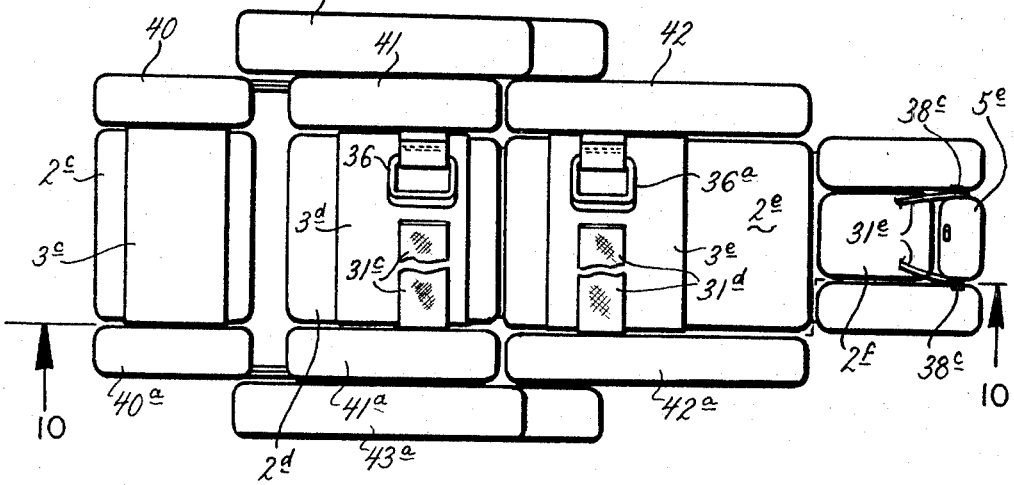
FIG. 10
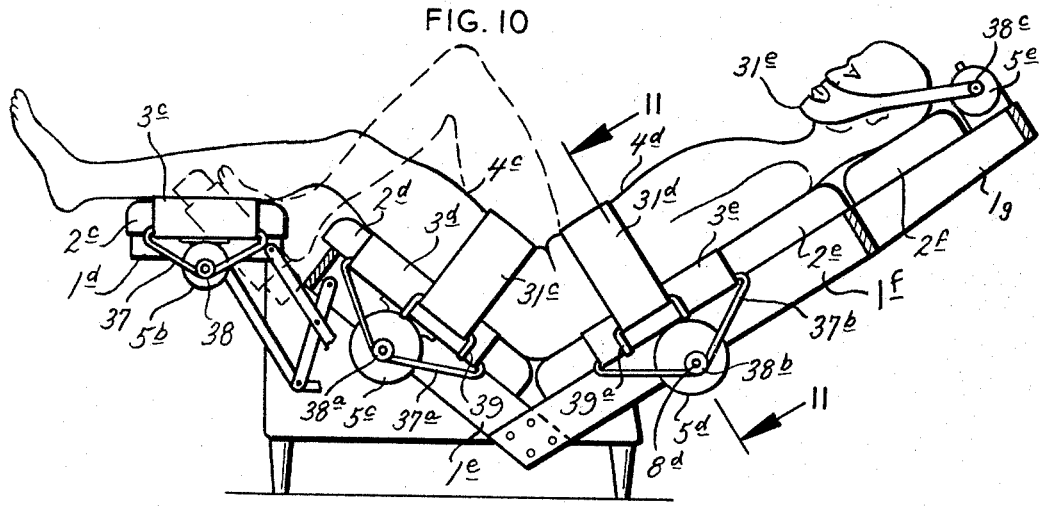
FIG. 11.
INVENTOR
KENNETH R. RUNDE
BY Bonita E. Runde
ATTORNEY

United States Patent Office 3,381,538
Patented May 7, 1968

3,381,538
VIBRATION APPARATUS
Kenneth R. Runde, 6626 Christopher Drive,
St. Louis County, Mo. 63129
Filed May 14, 1965, Ser. No. 455,934
2 Claims. (Cl. 74—87)

ABSTRACT OF THE DISCLOSURE

In a vibrating apparatus, means to selectively change the angular relationship of one eccentric trunnion relative to a fixed eccentric trunnion on a rotating shaft while the shaft is rotating. In addition, the claims disclose the use of weights instead of eccentric trunnions in an analogous situation.

---

The invention herein relates to the field of vibration and more particularly to control of the mode of vibration imparted to the object being vibrated.

The object of this invention is to provide a mechanism that may be manually adjusted while the vibrating mechanism is in operation in order to select the mode of vibration.

The prior art in the field of vibrators generally required that the vibrating mechanism be stopped, and the eccentric trunnions in the case of oscillating belts, and the eccentric weights in the case of the vibration of supporting structures, be changed in their angular relationship, to impart the desired mode of vibration.

In the present invention, when the eccentric trunnions are 180 degrees apart and for instance, connected to a massage belt, the vibration is a sawing back and forth motion. When they are 0 degree apart, the belt tugs equally on both ends of the belt resulting in a tugging or pulsing motion. Intermediate positions such as 90 degrees produce a combination of the foregoing modes.

Similarly, when the eccentric weights are 180 degrees apart, the supporting structure to which the shaft is mounted receives a rolling or rocking motion about a point midway between the eccentric weights. When the weights are 0 degree apart, the vibration is a pulsing back and forth motion. When the eccentric weights are 90 degrees apart, a combination of the foregoing vibration modes are imparted to the supporting structure.

In the accompanying drawings,

FIG. 1 is a sectional view taken longitudinally through the oscillating belts, the body member being massaged and the eccentric trunnions which impart the oscillating motion to the belts; also ends of the motor shaft that turn the trunnions. In addition, this sectional view shows the vibration mode adjusting mechanism with the trunnions 180 degrees apart.

FIG. 2 is a partial bottom view of FIG. 1, showing the end of the shift handle.

FIG. 3 is a longitudinal sectional view through adjustable sleeve and shifting ring with trunnion 8, rotated 90 degrees from position shown in FIG. 1.

FIG. 4 is a longitudinal sectional view through adjustable sleeve and shift ring with trunnion 8, rotated 180 degrees from position shown in FIG. 1.

FIG. 5 is a sectional view, 5—5 through adjustable sleeve and shift ring.

FIG. 6 is a partial sectional view taken longitudinally through two sets of oscillating belts, two body members, such as thighs of a pair of legs, and the eccentric trunnions that impart the oscillating motion to the belts; also ends of the motor shaft that turn the trunnions; in addition, the partial longitudinal sectional view shows a vibration mode adjusting mechanism basically the same as FIG. 1, except being shifted by a rod instead of a flat plate.

FIG. 7 is a sectional view taken through 7—7.

FIG. 8 is a sectional view taken through 8—8.

FIG. 9 is a top view of these oscillating belts incorporated in a recliner chair including the facial massage unit.

FIG. 10 is a sectional view taken through 10—10, showing application of the various oscillating belts to the human body.

FIG. 11 is a sectional view of FIG. 10, taken through 11—11.

The present invention includes a removable oscillating belt which is held in direct contact with certain body supporting portions of a resiliently padded surface of an article of furniture such as a couch or an adjustable reclining chair. This oscillating belt may be made of a flexible yet relatively non-elastic material, and may be readily removable from the trunnion.

In practice, the user may sit or lie on one or more of these oscillating belts 3, 3a, 3b, 3c, 3d, or 3e and the portion of the body contacting the belt is oscillated or vibrated by the motion of the belt. Should the user desire oscillation or massage of the thighs or abdomen, i.e., that part of the body opposite from the part affected by the first belt, such as the upper part of the thighs, while using the aforementioned belt, and adjustable second belt 31, 31a, 31b, 31c, 31d may be attached. This is illustrated by FIG. 1, wherein a supporting member 1 is capable of supporting the human form 4, and provided with a resiliently padded seat or back portion 2, an electric motor 5, which has rotating shaft extensions 6, 6a. Eccentric trunnions 8, 8a are incorporated in sleeves 7 and 7a, which are mounted on the ends of rotating motor shaft extensions 6 and 6a respectively. Sleeve 7a is secured to shaft extension 6a by the pin 11. Straps 28, 28a, having bearings at the lower end, are retained on the eccentric trunnions 8, 8a by snap rings 9, 9a. Flexible oscillating belt 3 is fastened to strap 28, 28a at 29, 29a. Thus the oscillating belt is held in contact with a resilient mass which is supported on the opposite side by a relatively rigid structure, vibration being imparted to the user by contact with the oscillating belt.

Second belt 31 is fastened to strap 28, 28a at 30, 30a, and is adjusted for the desired tension by use of self-locking buckle 32. FIG. 6 illustrates application of two sets of belts, wherein supporting members 1a and 1b, capable of supporting the thighs of a human form described as 4a, 4b, and provided with a resiliently padded seat, 2a, 2b, and an electric motor 5a, which has a rotating double shaft 6b, 6c operably mounted therethrough and an adjustable sleeve 7d.

Sleeves 7b and 7c, having eccentric trunnions 8b, 8c, are mounted and pinned to motor shaft extension 6b, and the long extension shaft 6c, respectively, by pins 11a and 11 respectively. Turnbuckles, 35 and 35a have bearings in their lower members and are retained on the eccentric trunnions 8b, 8c by snap rings. Flexible oscillating belts 3a and 3b are fastened to rigid straps 34, 34a by lapping the end of the belt around the strip and sewing the lapped ends. The middle of belts 3a, 3b is held by looping under rigid strip 34b. Links 33 connect strip 34b to eccentric trunnion 8e.

Second belts 31a, 31b are fastened to strips 34, 34a at 30b, 30c. The other ends are sewn to belts 3a, 3b, just above strip 34b, and are adjusted for the desired tension by use of self-locking buckles 32a, 32b. Thus the resilient mass which is supported on one side by a relatively rigid structure and snugly encompassed on the other side by an oscillating belt which is under tension, vibration is imparted to a portion of the user by contact with the exposed side of the oscillating belt opposite the resilient mass; and a second flexible belt which encompasses the opposite side of the portion of the user being vibrated by the first belt and said belt being oscillated under tension by connection to and the motion of said eccentric trunnions. The invention includes the combination of the conventional belt illustrated in the prior art and the aforementioned belt, which belt encompasses the opposite side of the user, the combination of which allows massage to be imparted to both sides of the user simultaneously.

Novel adjusting means for angular positioning of sleeve 7 makes possible selective angular adjustment of eccentric trunnion 8 to a choice of three modes of vibration. To accomplish this, the shift fork 13, in FIG. 1 (or 13a in FIG. 6) moves the ring 14 (or 14a in FIG. 6) to successively release ball 15, and then engage ball 16 and hold it in position to lock sleeve 7 to shaft 6 (or sleeve 7d to shaft 6c in FIG. 6). Movement of the ring 14 will first release the ball that is engaged and then lock the adjacent ball in the next angular position.

The change in angular relationship of the adjustable trunnion 8 relative to the fixed trunnion 8a, FIG. 1, is accomplished while the motor is running by moving the shift ring 14 into engagement with locking ball 15, 16 or 17. These locking balls are retained in radially drilled apertures in sleeve 7 by deforming the outer circumference of these apertures to a diameter slightly less than the ball diameter. The wall thickness of sleeve 7 is enough greater than the ball radius to allow the ball to clear the shaft 6 when the ball is in its extreme outer position.

Sleeve 7 is free to turn on shaft 6, but is restrained from lateral movement by a dog point set screw 10 (or 10a in FIG. 6), extending into a groove near the end of shaft 6. A concave keyway K having a radius of approximately that of the locking balls is cut into shaft 6, shown in FIGS. 1, 3, and 4, with an end view of the same shown in FIG. 5. Thus the shaft has a keyway to receive a ball locking element retained in the wall of the sleeve 7.

The shift and lock ring 14 has an inside diameter a little larger than the outside diameter of the sleeve 7 and fits over the outside of the sleeve. When the shift ring is in the position shown in FIG. 1, it holds the ball into the concave keyway K in shaft 6, and thus locks shaft 6 and sleeve 7 together, in which position trunnion 8 is 180 degrees from the fixed trunnion 8a when viewed from the end of the motor shaft 6a, thus this lock ring is capable of engaging and holding the locking element in engagement with the shaft keyway K and the sleeve wall. Locking ring 14 can be shifted laterally by moving shift handle 12 (12b in FIG. 6) to the left relative to fixed plate 27, shown in FIG. 1. Screws 26, 26a restrain and guide the shift fork assembly 13 (shown in FIG. 6, with shift rod 12a and shift handle 12b) by loosely engaging slots 24 and 25, respectively.

Ball 20, under light pressure from spring 19 and set screw 18, holds the shift fork assembly in the desired positions by engagement with the apertures 21, 22, 23, shown in FIG. 1. FIG. 2 is a view of this operation from the bottom side of the assembly. When the shift handle 12 is moved to the left, ball 20 is forced out of the countersink in aperture 21, and slides along fixed plate 27, and then into the countersink in aperture 22. Shift fork 13 (or 13a in FIG. 6), which loosely engages the sides of shift ring 14, first moves shift ring 14 to the left allowing ball 15, to move to its extreme outward position which unlocks sleeve 7 to shaft 6. As shift ring 14 moves further left, the internal bevel in the same engages ball 16 and forces it into the concave keyway in the shaft 6 as it turns relative to sleeve 7, resulting in locking sleeve 7 to shaft 6, as shown in FIG. 3. In this position, trunnion 8 is locked 90 degrees counterclockwise from trunnion 8a, when viewed from the end of shaft 6a. When shift handle 12 is moved left again, the same sequence of action takes place, i.e., release of ball 16 and engagement of ball 17 so that trunnion 8 is locked at 0 degree from trunnion 8a when viewed from the end of motor shaft 6a. When the shift handle 12 is moved to the right, the reverse of the above disengagements and engagements takes place.

In this vibrating massage apparatus, including a rotating shaft having an eccentric on each end, said trunnions are connected to the ends of a flexible belt for imparting oscillating motion to the user of said apparatus, wherein the angular relationship of the eccentric trunnions in planes perpendicular to the axis of the rotating shaft can be changed to impart selected vibration modes to the oscillating belt, and can be locked in selected angular relationship to the first trunnion while the shaft is rotating. A sleeve having an eccentric trunnion in one end thereof, said sleeve positioned to turn freely relative to the shaft, said shaft having a keyway to receive a locking element carried in the wall of the sleeve, a lock ring with a sliding fit over the outside of the sleeve, capable of engaging and holding the locking element in engagement with the shaft keyway and the sleeve wall.

Thus, when 180 degree relationship between the eccentric trunnions is desired, as shown in FIG. 1, and in detail in FIG. 5, the ring 14 holds ball 15 in position so that the eccentric trunnions 8 and 8a are 180 degrees apart when viewed from the end of sleeve 7. As one trunnion goes forward, the other moves backward creating a sawing back and forth motion of the straps 28 and 28a, which transmits this motion to belts 3 and 31 in FIG. 1.

In FIG. 4, the ring 14 holds ball 17 in position so that the angle between the eccentric trunnions is zero degree. Thus they move in the same direction, that is, both forward or both backward, always together, giving a tugging or pulsing motion to belts 3 and 31 in FIG. 1.

In the substantially 90 degree relationship of eccentric trunnions 8 and 8a, as illustrated in FIG. 3, the ring 14 holds the ball 16 so that one eccentric trunnion assumes a position halfway between the zero and 180 degree position. Thus, the belts 3 and 31 receive a combination of the two foregoing motions simulating a masseuse who pushes down and rubs forward, and then relaxes and returns to the starting position.

FIG. 10 illustrates the application of the aforementioned oscillating belts equipped with self-locking buckles 36, 36a to the human form, shown at 4c and 4d, using a different method of connecting the belts to the eccentric trunnions. A triangular-shaped hanger 37b is hooked over a nylon bearing 38b, which is retained on trunnion 8d of sleeve 7e, which in turn is pinned to shaft 6e of the motor 5d. Similar hangers are pinned to motors 5b and 5c. The belt 3e is lapped around the hanger 37b and sewn to fasten the belt to the hanger. Strap 31d, which is substantially narrower than the belt 3e, is attached to a hanger 39a, which hooks over the first hanger 37b, and can be adjusted laterally to massage a desired area of the torso.

In addition, while various parts of the body are being massaged by the aforementioned belt or belts in combination, a facial massage unit equipped with an under the chin strap or a facial mask can be used to massage under the chin, or by using a facial mask, both under the chin and over the face simultaneously.

In the exemplification, the top view of which is shown in FIG. 9, and the side view of which is shown in FIG. 10, a reclining chair is used which has a back 1f and a seat 1e permanently joined, and has a leg rest 1d, which extends outwardly by means of conventional mechanisms used on reclining chairs when the occupant positions the chair as shown in FIG. 10. Resilient pads 2c, 2d, and 2e are mounted respectively on 1d, 1e, and 1f.

The article of furniture is additionally equipped with a head supporting structure 1g on which is mounted a small motor 5e, having two shaft extensions. A facial mask or chin strap means 31e is attached to eccentric trunnions positioned on the ends of the motor shafts by means of nylon bearing 38c. A resiliently padded head support 2f is mounted on head supporting structure 1g.

Portions 40, 40a, 41, 41a, 42, and 42a are removable extensions of the lower leg rest, seat and back of the reclining chair respectively, shown in FIG. 9, and are for the purpose of gaining access to the removable hangers 37, 37a, 37b and 39, 39a. Portions 43 and 43a represent the stationary supporting side structure and arm rests of the conventional recliner chair.

FIG. 10 illustrates the possibilities of the chair's therapeutic value. An occupant may massage his feet, calves of his legs, thighs, abdomen and face at the same time, if desired, with massage being applied to the top surface and the bottom surface of his thighs and torso simultaneously.

It is obvious that by disconnecting the straps 28, 28a in FIG. 1, that trunnions 8, 8a (since they have some weight and are eccentric relative to the axis of the rotating shaft 6, 6a) will continue to deliver some vibration to the supporting structure 1 through sleeves 7, 7a, shaft 6, 6a, and the motor 5, which is attached to the supporting structure 1. Vibration would then be transmitted to any object in contact with 2.

For instance, when the eccentric trunnions are 180 degrees apart, as shown in FIG. 1, the vibration imparted to the object being vibrated would be a rocking motion in the plane of FIG. 1. When the trunnions are zero degree apart, as in FIG. 4, the vibration imparted to the object being vibrated would be a series of vertical up and down motions in the plane of FIG. 1. When the trunnions are 90 degrees apart, a combination of the 180 degrees and zero degree mode of vibration would result. In all three of the trunnion configurations just mentioned there would also be an accompanying vibration in a plane perpendicular to the plane of FIG. 1. In actual practice, the eccentric weights would be considerably larger than the eccentric trunnions shown in FIG. 1.

While there are disclosed but a limited number of embodiments of the invention herein presented, it is possible to produce still other embodiments without departing from the inventive concept disclosed, and it is desired therefore that only such limitations be imposed on the appended claims as are stated therein.

I claim:

1. In a vibrating apparatus, including a rotating shaft having one eccentric trunnion on each end thereof, the improvement wherein, one said trunnion is fixed relative to one end of the shaft, a tubular sleeve operably positioned on the opposite end of said shaft in freely turning relationship thereto, the second said trunnion attached to the outer end of said sleeve, multiple locking elements carried in the wall of said tubular sleeve, a lock ring positioned over the outside of said sleeve in sliding relationship thereto, a longitudinal keyway in said rotating shaft to selectively receive one of the aforementioned locking elements, to lock the tubular sleeve to the shaft in selected angular relationship to the fixed trunnion, while the shaft is rotating.

2. In a vibrating apparatus, including a rotating shaft having one eccentric weight on each end thereof, the improvement wherein, one said weight is fixed relative to one end of the shaft, a tubular sleeve operably positioned on the opposite end of said shaft in freely turning relationship thereto, the second said eccentric weight attached to the outer end of said sleeve, multiple locking elements carried in the wall of said tubular sleeve, a lock ring positioned over the outside of said sleeve in sliding relationship thereto, a longitudinal keyway in said rotating shaft to selectively receive one of the aforementioned locking elements, to lock the tubular sleeve to the shaft in selected angular relationship to the fixed weight while the shaft is rotating.

References Cited

UNITED STATES PATENTS

| 912,836 | 2/1909 | Giebler | 74—571 |
|---|---|---|---|
| 1,847,048 | 2/1932 | Orr | 128—63 X |
| 1,853,304 | 4/1932 | Folberth et al. | 128—63 |
| 1,854,713 | 4/1932 | Miller | 128—63 |
| 1,899,544 | 2/1933 | Whitney | 128—63 |
| 1,926,844 | 9/1933 | Folberth et al. | 128—63 |
| 2,243,013 | 5/1941 | Morley et al. | 128—63 |
| 3,130,603 | 4/1964 | Gessner | 74—600 |
| 1,758,663 | 5/1930 | Henrdy. | |
| 1,769,567 | 7/1930 | Goodrich. | |
| 1,969,247 | 8/1934 | Wolcott. | |
| 2,674,993 | 4/1954 | Harrell. | |
| 2,860,630 | 11/1958 | Christensen. | |
| 2,904,036 | 9/1959 | Thomas. | |

FOREIGN PATENTS

| 4,837 | 1/1894 | Sweden. |
|---|---|---|
| 29,184 | 7/1910 | Sweden. |

L. W. TRAPP, *Primary Examiner.*